(12) United States Patent
Nitsch et al.

(10) Patent No.: US 10,904,742 B2
(45) Date of Patent: Jan. 26, 2021

(54) COMMUNICATING A SUBSCRIBER IDENTITY MODULE TO A SERVER, IN PARTICULAR UPON CHANGING PROFILES

(71) Applicant: GIESECKE+DEVRIENT MOBILE SECURITY GMBH, Munich (DE)

(72) Inventors: Nils Nitsch, Markt Schwaben (DE); Ulrich Huber, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 153 days.

(21) Appl. No.: 15/739,529

(22) PCT Filed: Jun. 24, 2016

(86) PCT No.: PCT/EP2016/001084
§ 371 (c)(1),
(2) Date: Dec. 22, 2017

(87) PCT Pub. No.: WO2016/206813
PCT Pub. Date: Dec. 29, 2016

(65) Prior Publication Data
US 2018/0317083 A1    Nov. 1, 2018

(30) Foreign Application Priority Data
Jun. 25, 2015    (DE) .......... 10 2015 008 179

(51) Int. Cl.
*H04W 8/20*    (2009.01)
*H04W 4/50*    (2018.01)
*H04W 4/60*    (2018.01)

(52) U.S. Cl.
CPC ............. *H04W 8/205* (2013.01); *H04W 4/50* (2018.02); *H04W 4/60* (2018.02)

(58) Field of Classification Search
CPC ......... H04W 8/205; H04W 4/50; H04W 4/60; H04W 12/04
See application file for complete search history.

(56) References Cited

U.S. PATENT DOCUMENTS 9,426,731 B1 *  8/2016  Uy .................... H04W 48/18
9,451,461 B2    9/2016  Hartel et al.
(Continued)

FOREIGN PATENT DOCUMENTS

DE    102012018540 A1    3/2014
EP        2276294 A1    1/2011
(Continued)

OTHER PUBLICATIONS

"Information Technology—Identification Cards—Integrated Circuit(s) Cards with Contacts—Part 4: Interindustry—Commands for Interchange," International Standard, ISO/IEC 7816-4, Sep. 1, 1995, 51 Pages.
(Continued)

*Primary Examiner* — Anh Vu H Ly
*Assistant Examiner* — Hector Reyes
(74) *Attorney, Agent, or Firm* — Workman Nydegger

(57) ABSTRACT

A method for the communicating of a subscriber identity module, implemented or implementable in an end device, in which at least one profile is adapted for the utilization of the mobile end device in a mobile communication network, vis-à-vis a server, in which method a message from the subscriber identity module is sent to the server. Before the sending of the message, a step of the establishing of a technology is carried out in the subscriber identity module in which there is established, which technology the profile corresponds to, and the sending is carried out compliant with
(Continued)

the technology. The communicating can involve the notifying of a profile change effected in the subscriber identity module.

15 Claims, 2 Drawing Sheets

(56) References Cited

U.S. PATENT DOCUMENTS

| | | | |
|---|---|---|---|
| 2010/0311404 A1* | 12/2010 | Shi | H04W 8/205 |
| | | | 455/419 |
| 2012/0106533 A1 | 5/2012 | Chen et al. | |
| 2013/0303122 A1* | 11/2013 | Li | H04W 8/20 |
| | | | 455/411 |
| 2013/0339306 A1* | 12/2013 | Kim | H04W 8/205 |
| | | | 707/652 |
| 2014/0220952 A1 | 8/2014 | Holtmanns et al. | |
| 2015/0156679 A1 | 6/2015 | Li et al. | |
| 2015/0281957 A1 | 10/2015 | Hartel et al. | |
| 2015/0281964 A1* | 10/2015 | Seo | H04L 63/102 |
| | | | 726/9 |
| 2016/0241537 A1* | 8/2016 | Cha | H04W 12/04 |
| 2016/0277051 A1* | 9/2016 | Yang | H04B 1/3816 |
| 2016/0286380 A1* | 9/2016 | Long | H04W 76/10 |
| 2016/0353274 A1* | 12/2016 | Chichierchia | H04B 1/3816 |
| 2017/0188230 A1* | 6/2017 | Danree | H04W 8/18 |
| 2017/0325084 A1* | 11/2017 | Larignon | H04L 67/306 |

FOREIGN PATENT DOCUMENTS

| | | |
|---|---|---|
| WO | 2007133139 A1 | 11/2007 |
| WO | 2013075873 A1 | 5/2013 |
| WO | 2014131785 A1 | 9/2014 |

OTHER PUBLICATIONS

German Office Action from DE Application No. 102015008179.9, dated Mar. 10, 2016.
International Search Report from PCT Application No. PCT/EP2016/001084, dated Aug. 16, 2016.
International Preliminary Report on Patentability from PCT Application No. PCT/EP2016/001084, dated Dec. 26, 2017.
"Remote Provisioning Architecture for Embedded UICC Technical Specification," GSMA, Version 2.0, Oct. 13, 2014, 293 Pages.
Office Action from corresponding European Application No. 16732448.2, dated Sep. 17, 2019, 8 Pages.

* cited by examiner

* b2 b1 = 0 0 => logical channel 0 , ISO / IEC 7816-4, 5.4.1

COMMUNICATING A SUBSCRIBER IDENTITY MODULE TO A SERVER, IN PARTICULAR UPON CHANGING PROFILES

FIELD OF THE INVENTION

The invention relates to a method for the communicating of a subscriber identity module, implemented or implementable in an end device, in which at least one profile is adapted for the utilization of the mobile end device in a mobile communication network, vis-à-vis a server, in particular on the occasion of a profile change.

PRIOR ART

For utilizing a mobile end device such as a smartphone or mobile telephone in a mobile communication network of a network provider, the end device contains a subscriber identity module having a subscription profile (subscription profile=set of subscriber identity data), or in short also profile. The subscription profile is formed by a data set which enables the construction, operation and termination of a connection of the end device in the mobile communication network. The data set can be created in a file structure. The data set comprises data, in turn comprising general data and authentication data ("Credentials"), and applications. In particular, the data set—as a Credential—comprises a cryptographic authentication key Ki, as well as an Internationally Mobile Subscriber Identity IMSI. The subscriber identity module can be designed for example as a removable plug-in (U,C)SIM card (SIM=Subscriber Identity Modules) or UICC (Universally Integrated Circuit Card), or as solid-soldered (or provided for solid-soldering) eUICC (embedded UICC) or e(U,C)SIM.

SIM and USIM designate subscriber identity modules with a technology according to the 3GPP standard maintained by ETSI, which comprises GSM and UMTS. CSIM designates a subscriber identity module with a technology according to the standard 3GPP2, which comprises CDMA2000.

Meanwhile subscriber identity modules with several profiles are also proposed, of which as a rule respectively only one is in an active state or "enabled" status, and further profiles are in an inactive state or "disabled" status.

The document [1] SGP02-Remote-Provisioning-Architecture-for-Embedded-UICCTechnical-Specification-v2.0, 13 Oct. 2014, GSMA describes the remote maintenance of profiles in a subscriber identity module in the form of eUICC by means of a Sub Man Secure Router SM-SR. According to [1] Chap. 5.3.5, a profile in eUICC can be activated by means of a function "ProfileEnable" executed in the eUICC, thus put (switched) into an active state or status. After execution, the function is capable to output a function execution status which states whether the activation has been successful. This status can be sent to the Sub Man Secure Router SM-SR in a status message.

The document [2] DE 10 2012 018 540 A1 from the prior art discloses a subscriber identity module with two subscription profiles between which can be switched.

The document [3] WO 2013/075873 A1 from the prior art discloses a subscriber identity module with two subscription profiles between which can be switched.

The document [4] WO 2014/131785 A1 from the prior art discloses a method for the status change in a subscriber identity module having several subscription profiles. Through a status command "enable" or "disable" sent by a Subscription Manager Server to the subscriber identity module, a status of a profile can be changed between active and inactive. Response parameters and a response mode can be attached to the status command which the server sends, by which the server specifies in which form the subscriber identity module has to send a response (i.e. a reply) to the server.

In dependence on the technology employed in the subscriber identity module (e.g. 3GPP or 3GPP2), data connections and data elements (e.g., Short Message Service messages SMS), which the subscriber identity module exchanges with a server of the mobile communication network, are differently encoded. If a profile change between profiles takes place in a subscriber identity module which are subject to different technologies, the availability and/or transmission capability of the end device can therefore be lost or at least be impaired by a profile change. Hereby, in particular the situation can occur that after a profile change which involves a technology change, the subscriber identity module is no longer able to notify the Sub Man Secure Router SM-SR that the profile change has taken place.

In [4] WO 2014/131785 A1 the availability and/or transmission capability of the end device upon a profile change is guaranteed by attaching to the status command, with which the profile change is carried out, response parameters and a response mode which correspond to the profile to be activated. Hereby, the data volume to be transferred OTA is augmented by at least the particulars for the response parameters and the response mode. Upon an autonomous profile change within the subscriber identity module, without commissioning of the profile change on the part of the server, the method from [4] WO 2014/131785 A1 is furthermore not applicable and the availability and/or transmission capability of the end device can nevertheless be lost.

SUMMARY OF THE INVENTION

The invention is based on the object of providing an efficient method for communicating of a subscriber identity module, in which at least one profile is adapted for utilizing a mobile end device in a mobile communication network, vis-à-vis a server in which the availability and/or transmission capability of the end device stays guaranteed as good as possible. In particular such a method for communicating is to be stated, which can be used upon a profile change. The method should be usable in particular with an autonomous profile change which is carried out within the subscriber identity module, without commissioning of the profile change on the part of the server.

This object is achieved by a method according to claim 1. Advantageous embodiments of the invention are stated in dependent claims.

The method according to claim 1 is adapted for the communicating of an subscriber identity module (eUICC) implemented or implementable in an end device in which at least one profile is adapted for the utilization of the mobile end device in a mobile communication network, vis-à-vis a server. In the method, a message is sent from the subscriber identity module to the server. The method is characterized in that before the sending of the message, a step of establishing of a technology is carried out in the subscriber identity module in which there is established which technology the profile corresponds to, and the sending is carried out in a targeted manner compliant with the technology.

Because the technology is established before the sending of the message and the sending is effected in a targeted, technology-compliant manner, a failing of the sending is prevented, which in the prior art can arise from incompatibility between technology assumed in the subscriber identity module and the technological settings actually employed upon sending. In the prior art, a technology-compliant sending is effected at best randomly, e.g. in cases in which no technology change takes place. Hence the transmission capability of the subscriber identity module is ensured. Likewise, a communication partner who obtains a message sent as described above, can recognize the technology with the help of the message and send a technology-compliant response message back to the subscriber identity module. Hence the availability of the subscriber identity module is also ensured.

Summing up, according to claim 1 a method is therefore provided with which the availability and/or transmission capability of the end device remains guaranteed as good as possible.

Electively a subscription management server, in particular SubMan Secure Router SM-SR, is provided as a server.

Electively, 3GPP or/and 3GPP2 is provided as the technology. In this connection, electively in a single profile a technology can be employed continuously. Alternatively, several technologies are provided in a single profile.

Electively, a status message is provided as a message by which a status change of the profile, in particular activation or deactivation, is indicated.

Electively, the profile provided in the subscriber identity module is initially in an active status. Here, a status message is provided as a message, through which a profile change of the profile to a further profile implemented in the subscriber identity module is indicated. Especially upon a profile change it is important that the end device remains transmission-capable. Hereby it is guaranteed that the profile change can be communicated to the server, even then when the profile change involves a technology change, for example from CSIM to USIM or vice versa. In contrast, in the prior art a profile change can remain undiscovered because the subscriber identity module loses the transmission capability through the profile change and the server hence erroneously assumes that the original profile would still be active. Subsequent further communication between server and subscriber identity module under this assumption will likewise fail.

Electively, in particular initially the (original) profile in the subscriber identity module is further designed as the active profile, which thus has an active status. In addition to the profile, at least one further profile is implemented which is designed as an inactive profile, which thus has an inactive status. At least mostly, only respectively one profile at once has an active status. In the method, a profile change is carried out by deactivating initially the active profile so that it is put into an inactive status. Further, one of the further profiles is activated so that the further profile is put into an active status. After the profile change, the status message is sent to the server. If first the active profile is deactivated and subsequently the further profile is activated, only one profile is continuously active. In contrast, if first one of the further profiles is activated and immediately afterwards the originally active profile is deactivated, then at least mostly only a single profile is active at once, apart from the short time period between activation of the new profile and deactivation of the old profile. Preferably the profile change is, however, carried out through a switching between two profile containers so that the deactivating of the old (initially active) profile and the activating of the new profile is carried out through one and the same step. Electively, the profile change from an originally active "old" to a new profile is carried out by fixing, initially upon the old profile still being active, the profile container of the new profile as a profile container to be activated, thereupon by sending a reset command to the subscriber identity module, by switching, in reaction to the reset, the active profile from the profile container of the old profile to the profile container of the new profile, and finally by beginning the normal communication, beginning with an ATR (Answer to Reset) and, where applicable, subsequent APDUs. In this connection, the profile switching is carried out after the reset and before the ATR. Instead of RESET, where applicable, a different command equivalent as to the technical effect could be also employed.

Electively, on the occasion of the step of establishing the technology, on basis of a result of the establishing, one or several communication channels are specified which are subsequently employed for the communication of the subscriber identity module vis-à-vis the server. In particular, several communication channels ordered according to an instruction for use, in particular according to a prioritization or selection, can be specified. Electively, respectively one communication channel can be associated with one technology, electively respectively a different communication channel, however, electively also in some or all cases the same communication channel.

Electively, the communication channels comprises one or several the following: a data connection, a Short Message Service connection (SMS), a speech message connection (specialist term "Voice"), an SS string connection, a USSD string connection.

Electively, at least two partial areas are provided in one individual profile, which correspond to the different technologies (e.g. USIM and CSIM), wherein for the at least two different technologies respectively one different communication channel is specified, e.g. data connection LTE for USIM and voice connection for CSIM, or vice versa.

Electively, the message sent or to be sent by the subscriber identity module to the server is embedded in a 3-way handshake protocol. Here, the message is sent as the first message. According to the 3-way handshake protocol, after the sending of the first message, a second message is to be sent from the server to the subscriber identity module, and after the sending of the second message, a third message is to be sent from the subscriber identity module to the server. All three messages are sent in the completely carried out 3-way handshake protocol. In the prior art, there can be aborting in the protocol due to lost transmission capability through unrecognized technology change. Such aborting is prevented with the invention.

Electively, messages notifying of a profile change are communicated embedded in a 3-way handshake protocol and other messages are communicated embedded in a 2-way handshake protocol. The particularly critical message about the profile change is sent in the 3-way handshake protocol which offers a higher security. Less critical subsequent general messages will be transferred in the more data-saving 2-way handshake protocol.

Electively, the step of establishing a technology is carried out by establishing a parameter which has a parameter value specific to a technology.

Electively, a parameter field (e.g. ADF) is read out for the parameter establishment. This can happen electively by direct, targeted readout. Alternatively, the parameter field can be read out by processing a command, e.g. an ISO/IEC 7816-4 command like AUTHENTICATE or an ETSI TS 102 223 PROVIDE LOCATION INFORMATION in the subscriber identity module on the occasion of whose processing the parameter is employed. In this connection, the parameter field is incidentally also read out on the occasion of the command processing.

Electively, one logical channel is associated with the technology according to ISO/IEC 7816-4, in particular the base channel channel 0, or, where applicable, if several technologies are present in the profile, a separate logical channel is associated with each technology according to ISO/IEC 7816-4.

BRIEF DESCRIPTION OF THE DRAWINGS

Hereinafter the invention will be explained more closely on the basis of exemplary embodiments and with reference to the drawings, in which are shown.

DETAILED DESCRIPTION OF EMBODIMENT EXAMPLES

Figure 1:
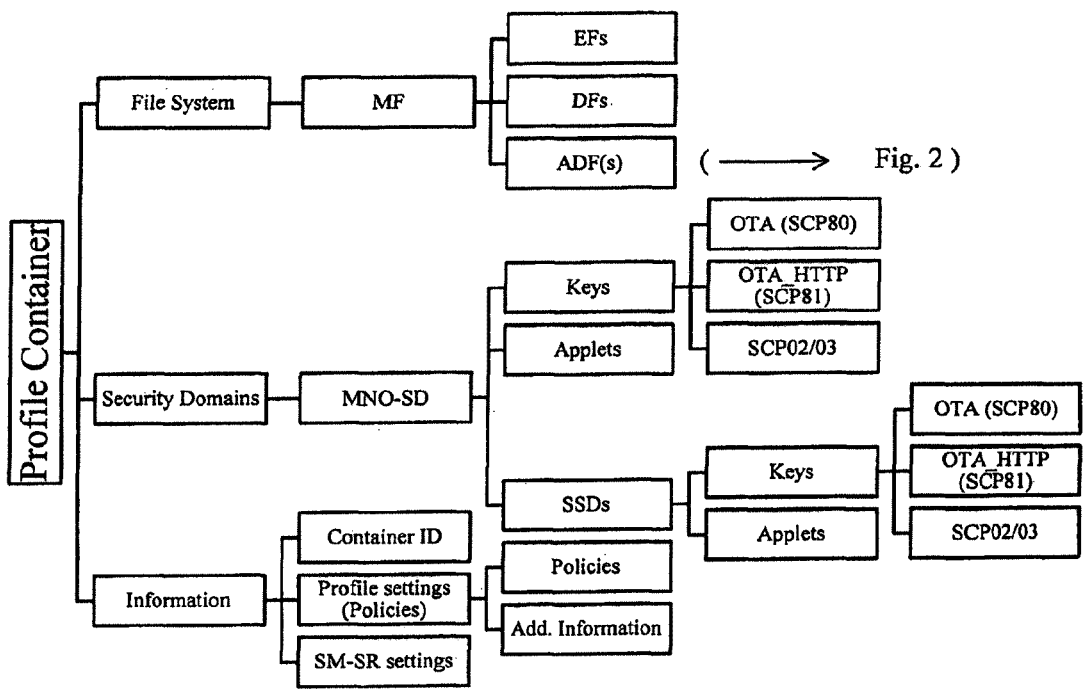
FIG. 1 a diagram about a profile for a mobile communication registration.
Figure 2:
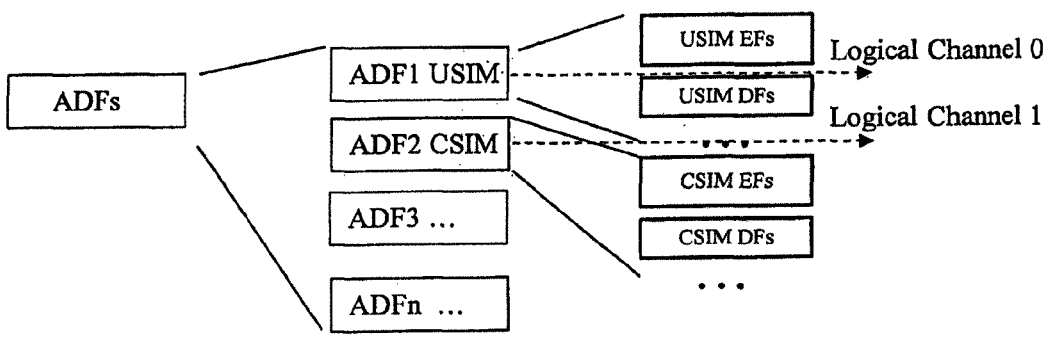
FIG. 2 a detailed diagram of the application data field shown in FIG. 1.

FIG. 1 shows a diagram of a profile for a mobile communication subscription which is constructed from the basic structure according to the prior art ISO/IEC 7816-4, and which is suitable for the realization of the invention. In FIG. 1, the profile is deposited in a profile container "Profile Container" by way of example. In FIG. 1 and FIG. 2, English-language technical terms are commonly employed, which are employed in relevant technical standards, and which are employed partly also in German without being translated into German. The profile container contains a file system "File System" which in turn contains a master file MF. Subordinate or coordinate to the master file MF, the profile container contains elemental files "Elementary Files" EFs, dedicated files "Dedicated Files" DFs and application data files "Application Data Files" ADFs.

Of special importance for the invention are the application data files "Application Data Files" ADFs, as is represented in detail with the help of FIG. 2. The profile contains at least one application data file "Application Data File" ADF1 to which in turn EFs and DFs are subordinate, as are shown schematically in FIG. 2. In the Application Data File ADF1, in particular a technology is stated which the profile is being operated under, for ADF1 e.g. USIM.

Further important in connection with the invention is the object "SM-SR-Settings" in which there can be recorded, among other things, which communication channel (e.g. SMS, voice connection, data connection) is to be employed, and thereby, where applicable, which communication channel in dependence on certain conditions.

A given communication channel can optionally have been fixed also already during the production of the subscriber identity module (traditionally to some extent still called "card production", even if the form factor is not necessarily any longer that of a card) as the standard communication channel which is employed, provided that no explicit instruction to the contrary is granted for a communication channel.

FIG. 2 shows, according to one embodiment of the invention, a area of application data files "Application Data Files" ADFs, in which several application data files "Application Data Files" ADFs ADF1, ADF2, ADF3, . . . ADFn are contained. A first application data file ADF1 is adapted for the technology USIM. A second application data file ADF2 is adapted for the technology CSIM. For the first ADF1, operated under USIM, the base channel "Logical Channel 0" according to ISO/IEC 7816-4 is reserved. For the second ADF2 operated under CSIM, a channel different from the base channel "Logical Channel 1" according to ISO/IEC 7816-4 is reserved. For further ADFs and technologies, further logical channels can be reserved.

Figure 3:
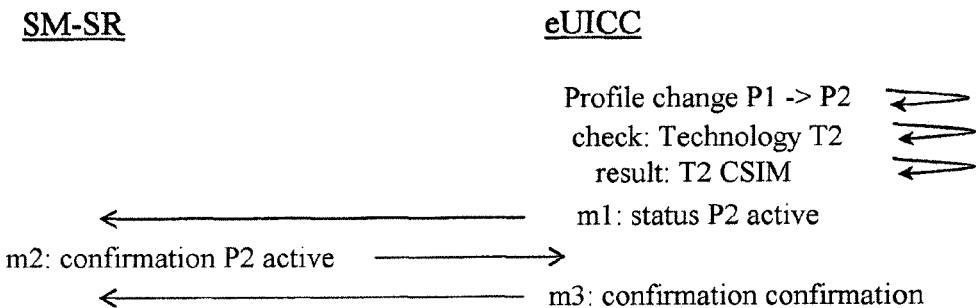
FIG. 3 a diagram for illustrating the invention.

FIG. 3 shows a diagram in which a method is illustrated for communicating of a subscriber identity module eUICC vis-à-vis a server SM-SR on the occasion of a profile change, according to a first embodiment of the invention. The server is designed as Subscription Management Secure Router SM-SR according to [1] SGP02-Remote-Provisioning-Architecture-forEmbedded-UICC-Technical-Specification-v2.0, 13 Oct. 2014, GSMA. In the example from FIG. 3, respectively only a single technology is fixed in each profile P1, P2, according to a basis form of the invention.

An initially active profile P1 and a further profile P2 are implemented in the subscriber identity module eUICC. Each of the two profiles P1, P2 is, for example, deposited in a separate Profile Container as the one shown in FIG. 1, FIG. 2. In the Application Data Field ADF, the technology employed for the profile (or several technologies, cf FIG. 2) is specified. In this connection, different profiles can be subject to different technologies. The subscriber identity module eUICC internally carries out a profile change from the initially active profile P1 to the further profile P2, thus activates the further profile P2 and deactivates the initially active profile P1 (in whatever way and order, where applicable). The profile change can preferably be effected completely independently in the subscriber identity module eUICC, can, alternatively, however, also be triggered from externally by the server SM-SR. After the profile change, the subscriber identity module eUICC checks (pseudo command "check"), which technology the new active profile P2 corresponds to and establishes as a technology T2 of P2 the technology CSIM. Subsequently, the subscriber identity module eUICC notifies the server of SM-SR in a 3-way handshake that the further profile P2 is now the active profile. For this purpose, the subscriber identity module eUICC sends a first status message m1 to the server SM-SR. The server SM-SR receives the first message m1 and now knows that the communication channel of the subscriber identity module eUICC to the server SM-SR is functioning. The server SM-SR sends to the subscriber identity module eUICC a second message m2 as a confirmation of the reception of the first message m1. The subscriber identity module eUICC receives the second message m2 and now knows that both communication channels between subscriber identity module eUICC and server SM-SR are functioning. Upon the second message m2, the subscriber identity module eUICC sends a third message m3 to the server SM-SR, as a confirmation of the reception of the first confirmation. The server SM-SR receives the third message m3 and now knows that both communication channels between subscriber identity module eUICC and server SM-SR are functioning.

Figure 4:
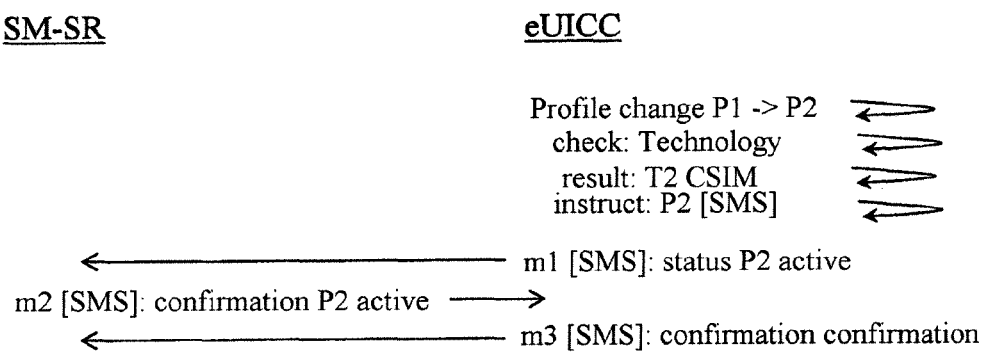
FIG. 4 a further diagram for illustrating the invention.

FIG. 4 shows a diagram in which a method is illustrated for the communicating of a subscriber identity module eUICC vis-à-vis a server SM-SR on the occasion of a profile change, according to a second embodiment of the invention. Fundamentally the method is constructed analogous to that of FIG. 3. Additionally, in the method there is fixed (pseudo command "instruct") according to FIG. 4, after the establishing of the correct technology in the further profile P2, here likewise CSIM, that for the now active further profile P2, having technology CSIM, the communication channel of the Short Message Service messages SMS should be employed. Accordingly, the first, second and third message m1, m2, m3 are sent in the form of Short Message Service messages SMS. Instead of SMS, data connection can alternatively be fixed as a communication channel.

The "instruct" command, with which the communication channel is fixed, can, for example, be part of the command GSMA ENABLE, with which a profile is activated.

In developments of the second embodiment according to FIG. 4, a list of prioritized communication channels is fixed by means of "instruct". For example, it is fixed that initially sending the first message m1 as SMS is attempted. If the sending by means of SMS fails, a sending via a data connection is attempted next. Electively, data connection first is attempted, then SMS.

Figure 5:
FIG. 5 a diagram for illustrating the establishing of a technology through the processing of a command INTERNAL AUTHENTICATE in the subscriber identity module.

FIG. 5 shows a diagram for illustrating the establishing of a technology T, here CSIM, through the processing of a command INTERNAL AUTHENTICATE in the subscriber identity module eUICC. The ETSI Home Location Register HLR sends an authentication request to the subscriber identity module eUICC. In reaction, the subscriber identity module eUICC creates an AUTHENTICATE APDU according to [5] ISO/IEC 7816-4. For creating the AUTHENTICATE APDU, the subscriber identity module eUICC has to establish the employed technology internally anyway. The thus established information item about the employed technology is employed for the selection of the communication channel.

A specifying of a technology which is to be employed in eUICC is preferably carried out in a per se known manner upon booting the subscriber identity module eUICC in the mobile end device and typically comprises the execution of the following functions.

SELECT MF: Selecting an MF and with this recognizing whether ADFs are provided.

SELECT EF_Dir: EF_Dir contains the application identifier AIDS of all ADFs present on the eUICC.

SELECT ADF: Selecting a special ADF from the listing in the EF_Dir and hereby specifying the special ADF and hence the technology according to the special ADF.

As a rule, the booting of the eUICC is carried out on the base channel logical channel 0. Hereby, after the starting up, the technology (and the corresponding ADF) corresponding to the base channel logical channel 0 is fixed.

CITED PRIOR ART

[1] SGP02-Remote-Provisioning-Architecture-for-Embedded-UICC-Technical-Specification-v2.0, 13 Oct. 2014, GSMA
[2] DE 10 2012 018 540 A1
[3] WO 2013/075873 A1
[4] WO 2014/131785 A1
[5] ISO/IEC 7816-4, "Information technology—Identification cards—Integrated circuit(s) cards with contacts—Part 4: Interindustry commands for interchange", 1995

The invention claimed is:

1. A method for communicating of a subscriber identity module, implemented or implementable in an end device, in which at least one profile is adapted for the utilization of the end device in a mobile communication network, vis-à-vis a server, in which method a status message indicating a status change of the profile is sent from the subscriber identity module to the server,
wherein before the sending of the status message, a step of the establishing of a technology is carried out in the subscriber identity module in which there is established, which technology the profile corresponds to, and the sending is carried out compliant with the technology;
said technology being specified in an Application Data Field of the profile;
wherein on the occasion of the step of establishing the technology, on basis of a result of the establishing, several communication channels are specified which are subsequently employed for the communicating of the subscriber identity module vis-à-vis the server, including several communication channels ordered according to an instruction for use, including prioritization or selection, wherein respectively one communication channel is associated with one technology.

2. The method according to claim 1, wherein as the server a subscription management server is provided.

3. The method according to claim 1, wherein 3GPP or/and 3GPP2 is provided as a technology.

4. The method according to claim 1, wherein the status message indicating the status change of the profile includes indication of profile activation or deactivation.

5. The method according to claim 1, wherein the profile is initially in an active status and the status message is provided, through which a profile change from the profile to a further profile implemented in the subscriber identity module is indicated.

6. The method according to claim 5, wherein
initially the profile in the subscriber identity module is designed as active profile, which has an active status;
in addition to the profile, at least one further profile is implemented, which is designed as inactive profile, which has an inactive status, wherein respectively only one profile at once is in an active status;
in the method, a profile change is carried out by deactivating the initially active profile so that it is put into an inactive status, and activating one of the further profiles so that the further profile is put into an active status; and
after the profile change, the status message is sent to the server.

7. The method according to claim 1, wherein the communication channels comprise one or several the following: a data connection, a Short Message Service connection, a speech message connection, an SS string connection, a USSD string connection.

8. The method according to claim 1, wherein in an individual profile at least two partial areas are provided which correspond to the different technologies, and wherein for at least two different technologies respectively one different communication channel is specified.

9. The method according to claim 1, wherein the status message from the subscriber identity module to the server is embedded in a 3-way handshake protocol, wherein the status message is sent as a first message, wherein according to the 3-way handshake protocol after the sending of the first message a second message is to be sent from the server to the subscriber identity module, and after the sending of the second message a third message is to be sent by the subscriber identity module to the server.

10. The method according to claim 9, wherein messages notifying of a profile change are communicated embedded in a 3-way handshake protocol and other messages are communicated embedded in a 2-way handshake protocol.

11. The method according to claim 1, wherein the step of the establishing of a technology is carried out by establishing a parameter which has a parameter value specific to a technology.

12. The method according to claim 11, wherein the parameter is established by reading out a parameter field, including by processing a command in the subscriber identity module, on the occasion of its processing the parameter is employed, and wherein on the occasion of the processing the parameter field is read out.

13. The method according to claim 1, wherein a logical channel is associated with the technology according to ISO/IEC 7816-4, including the base channel channel 0, or where applicable, a separate logical channel is associated with each technology according to ISO/IEC 7816-4.

14. The method according to claim 2, wherein as the subscription management server a SubMan Secure Router is provided.

15. A method for communicating of a subscriber identity module, implemented or implementable in an end device, in which at least one profile is adapted for the utilization of the end device in a mobile communication network, vis-à-vis a server, in which method a status message indicating an autonomous status change of the profile is sent from the subscriber identity module to the server, wherein before the sending of the status message, a step of the establishing of a technology is carried out in the subscriber identity module in which there is established, which technology the profile corresponds to, and the sending is carried out compliant with the technology;

said technology being specified in an Application Data Field of the profile;

wherein on the occasion of the step of establishing the technology, on basis of a result of the establishing, several communication channels are specified which are subsequently employed for the communicating of the subscriber identity module vis-à-vis the server, including several communication channels ordered according to an instruction for use, including prioritization or selection, wherein respectively one communication channel is associated with one technology; and wherein the status message from the subscriber identity module to the server is embedded in a 3-way handshake protocol, wherein the status message is sent as a first message, wherein according to the 3-way handshake protocol after the sending of the first message a second message is to be sent from the server to the subscriber identity module, and after the sending of the second message a third message is to be sent by the subscriber identity module to the server.

* * * * *